May 23, 1944. J. W. BATCHELDER 2,349,336
CUTTING BLADE AND METHOD OF CUTTING THEREWITH
Filed April 23, 1940

INVENTOR
JAMES W. BATCHELDER.
BY Francis H. Beter
ATTORNEY

Patented May 23, 1944

2,349,336

UNITED STATES PATENT OFFICE 2,349,336

CUTTING BLADE AND METHOD OF CUTTING THEREWITH

James W. Batchelder, Titusville, Pa., assignor, by mesne assignments, to The Fred Goat Co., Inc., Brooklyn, N. Y., a corporation of New York Application April 23, 1940, Serial No. 331,108

2 Claims. (Cl. 164—70)

This invention relates to the art of cutting continuously moving webs of paper, paper board, laminated paper products and similar materials, and aims to provide an improved cutting blade and an improved method of cutting therewith.

In the cutting of continuously moving paper board, as a part of the production of a carton or box for the shipping of merchandise, for example, many problems and difficulties are encountered. If cutting members having a vertical reciprocating movement are employed, the cutting mechanism should be moved in synchronism with the longitudinal movemment of the paper board, so that the cut may be properly made in register with any printed matter or other indicia previously applied; and the waste stock should be removed so that the desired blank may be suitably delivered. While it is possible to attain both of these ends, the operations cannot easily be carried out at the speeds corresponding to those attained by other equipment used in the manufacturing of the cartons or boxes, such as the high speed printing presses that are now available and in use. Furthermore, it is necessary to make frequent replacements in cutting blades and these obviously result in delays in production.

While the principles of rotary cutters lend themselves well to higher speeds of operation, cutters of this character that are now available have many inherent faults that prevent their economical use in industry. For example, unless the parts are machined, adjusted and maintained in accurate relationship, the cutting will not take place in proper register with any prior operations on the paper board. Moreover, the contact of the cutting blades with the impression cylinder or cooperating shearing edge and the resulting wear necessitate frequent replacement of the blades. Since higher speed may be obtained with rotary cutters, such replacements may be even more frequent than in the reciprocating type of cutter. In addition, the high speed and type of cutting produce great quantities of paper dust which is troublesome to handle. In short, while the work produced by rotary cutters that are now available may be regarded as satisfactory, the machines themselves are a constant source of trouble, hazard and expense.

I have discovered that the above and other difficulties may be successfully overcome and effective cutting may be carried out at web speeds of 400 feet per minute and over—by advancing a suitably shaped cutting member progressively into a moving web, which is preferably maintained under tension, and causing such compressive stresses to be set up in the paper board on each side of the proposed line of cut that the board will be severed without bringing the cutting edge into contact with its cooperating impression surface, whereby the blade need not be moved completely through the paper board for finished severing.

In accordance with my invention, the web of paper board, after being printed or otherwise treated and ready for cutting, is brought into contact with, and maintained in tension over the surface of, a rotating impression cylinder. While in contact with this cylinder, an angular or curved faced cutting blade having a relatively blunt cutting edge is progressively moved into the paper board. This progressive movement of the blade into the board is continuous until the cutting edge thereof is substantially completely through the thickness of the paper board. Due to the fact that the board is suitably maintained under tension in contact with the impression surface, I have found that compressive stresses are set up within the board of sufficient moment to cause the board to be severed completely before the blade passes entirely therethrough. Accordingly, I have arranged the parts of the apparatus devised for practicing this improved method of cutting to maintain the cutting blade out of contact with the impression cylinder during the cutting operation. I have found, moreover, that by employing a cutting blade having a relatively blunt cutting edge and either angular or broad sloping cutting faces, the formation of the compressive stresses within the board is enhanced with the result that more effective severing is accomplished with a blade of this character. Both the shape of the blade and the method of cutting therewith in which the blade is not brought into contact with the impression surface greatly decrease the wear in the blade and reduce the number of replacements. Furthermore, because of the progressive movement of my improved blade into the paper board and the compressive stresses set up therein, I have found that a sharp and clean cut is produced and paper dust, being clamped within the board by the action of the cutting tip, is reduced to a minimum.

The above and other features, objects and advantages of my invention will become apparent upon consideration of the following detailed description and the accompanying drawing in which.

Figure 1:
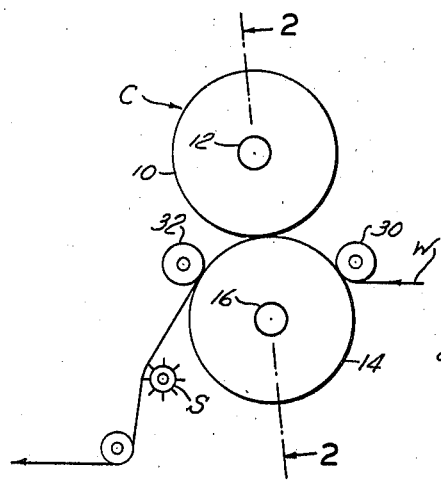
Fig. 1 is a diagrammatic side elevational view of one form of rotary cutting apparatus with which my invention may be effectively practiced.

Referring now to the drawing, and particularly Fig. 1, it will be seen that a web or strip W of paper board or other material to be operated upon is fed from a suitable source of supply (not shown) through any desired initial web treating apparatus and is then passed to a rotary cutter C where it is cut into blanks of the desired size and configuration. Waste material not forming part of the blanks and severed from the web by the cutter C may be removed from the web by means of any suitable stripping device S so that the blanks may be delivered or passed to any desired fabricating machine.

Figure 2:
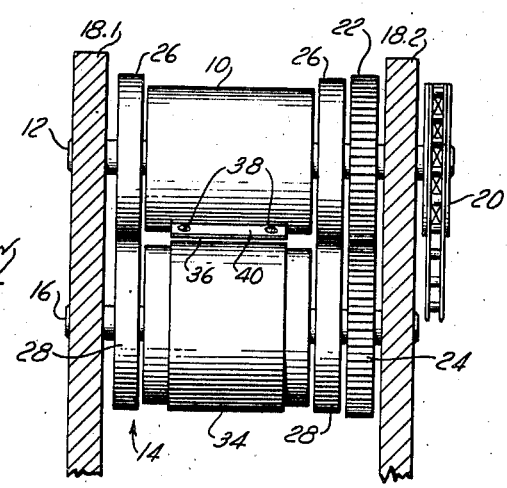
Fig. 2 is a somewhat diagrammatic front elevational view of the apparatus shown in Fig. 1, the view being taken substantially along the line 2—2 of Fig. 1 and showing the side frames in section.

As shown in Fig. 2, the rotary cutting mechanism C, which preferably is of the type disclosed in my copending application with Joseph A. Parks, Jr., Serial No. 331,109, filed concurrently herewith, comprises an upper cutting cylinder 10 mounted on a shaft 12 and a cooperating impression cylinder 14 mounted on a shaft 16. Both of the shafts 12 and 16 are journalled in suitable bearings provided in left and right hand side frames 18—1 and 18—2, respectively. Cutting cylinder 10 may be rotated at the desired speed, as by means of a suitable sprocket 20 fixed to the shaft 12 outside the frame 18—2 and connected to any suitable source of power (not shown); and impression cylnder 14 is caused to rotate in synchronism therewith through interconnecting gears 22 and 24 mounted upon the shafts 12 and 16, respectively. It will be noted that cutting cylinder 10 is provided with bearing surfaces 26 at the end thereof and these are adjusted cooperatively to engage corresponding bearing surfaces 28 provided near the ends of the impression cylinder 14.

In order to maintain the web under proper tension and in proper position as it passes through the cutting apparatus, an entering guiding or pressure roller 30 is provided on one side of the impression cylinder and a guide or feeding pressure roller 32 is provided at the opposite or leaving side of the impression cylinder 14. These rollers may be supported in any convenient manner between the side frames 18—1 and 18—2 and are maintained in cooperative engagement with an impression surface 34 provided on the impression cylinder 14. Thus, the web W is led beneath the roller 30 and over the impression surface 34 to the feed or guide roller 32 and is maintained in a state of tension for improved cutting action produced by a cutting blade 36 secured to the cutting cylinder 10 in any convenient manner, such as by means of screws 38. Although the cutting blade 36 may be secured to the cutting cylinder 10 in any of a number of ways, I have shown the cutting blade 36 permanently secured, as by welding, to a carrier member 40 with which the screws 38 cooperate. The arrangement of the cutting blade 36 when in cooperative cutting relationship with the impression surface 34 is such that said blade 36 does not contact the impression surface, this being accomplished by the setting of the blade and the use of the cooperating bearing surfaces 26 and 28. The distance the blade 36 is maintained from the impression surface depends to some extent upon the thickness and type of the paper board being cut; and for ordinary paper box board having a thickness of from 0.010 to 0.028 of an inch, this space or distance between the cutting edge of the cutting blade and the impression surface at the cutting line may be on the order of 0.0005 to 0.0010 of an inch. I have only shown one cutting blade 36 mounted upon the cutting cylinder 10 but it will be understood that any suitable number may be employed depending upon the desired distance between the cuts.

Figure 3:
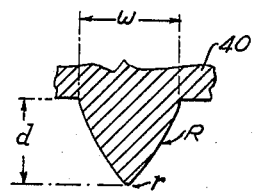
Figs. 3 and 4 are transverse vertical sectional views, on an enlarged scale, of two different types of cutting tips constructed in accordance with my invention.
Figure 4:
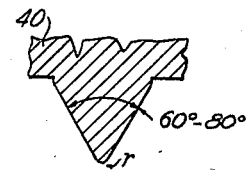

As shown in Figs. 3 and 4, the preferred form of cutting blade embodying my invention comprises a blade which is substantially wedge-shaped and provided with a blunt cutting edge. The blade is preferably constructed of a suitable high speed steel or other alloy having good wearing characteristics. Materials such as "Stellite" and "Carballoy" have been found suitable. In cross-section, the width $w$ and the depth $d$ of the blade will be governed somewhat by the thickness of the paper board to be cut or severed and the angle between the cutting faces; that is the depth $d$ in any case is greater than the maximum thickness of board, and the width $w$ will depend on the thickness of the stock from which the blade is made, if rule blades are used, and on the angle of the blade faces. In the form shown in Fig. 3, the sides or flanks of the blade are curved. The radius of curvature which I have found satisfactory for board thicknesses of from 0.0010 to 0.0040 inch is preferably approximately .025 inch and said curved sides, which though curved are disposed at an angle of from 55° to 80° with respect to one another, join with the blunt cutting edge. For most thicknesses of paper board, the blunt cutting edge may be an arc of a cylinder or portion thereof having a radius $r$ of some .002 to .004 inch. In Fig. 4 I have shown another form of cutting blade which is similar to the blade shown in Fig. 3 except for the fact that the sides thereof are straight or uniplanar rather than curved and the angle between the straight side is preferably from 55° to 80°. The blunt cutting edge is curved upon a radius of from .002 to .004 inch. When the term cutting blade is used herein, I mean to include only the actual cutting portion of the blade which has just been described. This blade may be formed as part of a rule type or block type cutting member, it being the actual shape of the cutting blade which forms a part of my invention.

Figures 5, 6, 7, 8, 9:
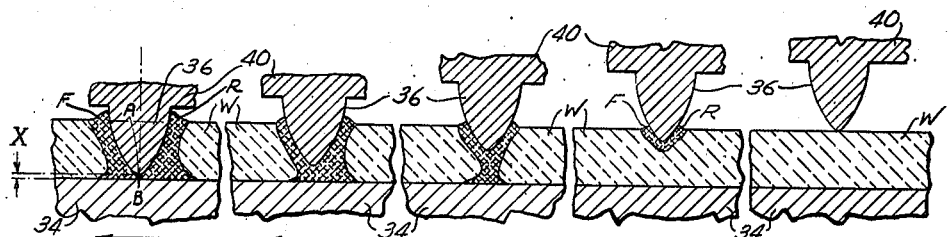
Figs. 5, 6, 7, 8 and 9 are diagrammatic transverse sectional views illustrating the progressive movement of my improved cutting tip into the paper board and the formation of compressive stresses therein.

Referring now to Figs. 5, 6, 7, 8 and 9, where I have illustrated my improved method of cutting with the blade described above as the method is carried out in passing the web W through the cutting apparatus diagrammatically illustrated in Figs. 1 and 2, it will be observed that a forward area F and a reverse area R of compression or compressive stress are set up in the web W as the cutting blade 36 is moved thereinto. In accordance with my improved method of cutting, the blade 36 is moved progressively into the board and, as it moves, the areas of compressive stress increase in size through the board or web W. In Fig. 6 the area of compressive stress merely extends about the portion of the cutting blade which is inserted or pressed into the board. As the blade 36 moves downward the areas F and R will increase in size, join together and extend through to the bottom of the web W. Due to the compression, the material in the web tends to pile up or swell around the cutting blade, as illustrated in Fig. 7. This swelling and the areas of compressive stress increase as the blade moves downward.

With my improved shape of cutting blade, I have found that, when the cutting edge of the blade reaches a point or line substantially .0005 to .0010 inch from the bottom surface of the board, the distance X in Fig. 9, the compressive stresses set up in the fibers of the web are greater than the tensile strength of said fibers directly under the tip or cutting edge of the blade, and the board is therefore caused to break or snap apart along the desired line of cut. When practicing my improved method of cutting with the apparatus described above, because of the rotating movement of the cutting blade and the impression surface, I have found that the cutting edge has a slight tangential movement, substantially along the line A—B shown in Fig. 9, which causes the area of compressive stress R behind the cutting blade to be greater than the area F in front of said blade.

From the foregoing description it will be apparent that it is possible to obtain many practical advantages with my improved cutting tip and method of cutting. Most important among these is the elimination of the major factor of cutting edge wear due to the elimination of contact between the cutting edge and the impression cylinder. Because of the type of cutting action and the compressive stresses set up within the web, the amount of paper dust produced during the cutting action is reduced to a minimum. Various changes may be made in the construction of the tip and in the method of cutting, and certain features thereof may be employed without others without departing from my invention or sacrificing any of its advantages.

What I claim is:

1. In a cutting member for sharply severing a traveling web of paper board without having the member pass completely through the web, a doubly tapered cutting blade comprising side faces disposed at an angle of from 55° to 80° with respect to one another, and a curved cutting edge having a radius of from 0.002 to 0.004 inch joining said faces.

2. In a cutting member for sharply severing a travelling web of paper board without having the member pass completely through the web, a doubly tapered cutting blade comprising side faces disposed at an angle of from 55° to 80° with respect to one another, each side face being curved on a radius of about 0.025 inch, and a curved cutting edge having a radius of from 0.002 to 0.004 inch joining said curved cutting faces.

JAMES W. BATCHELDER.